United States Patent [19]

Yamaguchi et al.

[11] 4,448,842

[45] May 15, 1984

[54] MAGNETIC RECORDING MEDIUM

[75] Inventors: Nobutaka Yamaguchi; Nobuo Tsuji; Masaaki Fujiyama, all of Kanagawa, Japan

[73] Assignee: Fuji Photo Film Co., Ltd., Kanagawa, Japan

[21] Appl. No.: 345,848

[22] Filed: Feb. 4, 1982

[30] Foreign Application Priority Data

Feb. 4, 1981 [JP] Japan .................................. 56-15389

[51] Int. Cl.$^3$ ............................................... G11B 5/70
[52] U.S. Cl. ................................... 428/329; 428/323; 428/694; 428/695; 428/337; 428/900; 427/128; 252/62.54; 360/134; 360/135; 360/136
[58] Field of Search ............... 428/900, 694, 695, 329, 428/323, 337; 252/62.54; 427/128; 360/134–136

[56] References Cited

U.S. PATENT DOCUMENTS

| | | | |
|---|---|---|---|
| 4,275,115 | 6/1981 | Naruse | 428/694 |
| 4,322,474 | 3/1982 | Matsuura et al. | 428/900 |
| 4,411,966 | 10/1983 | Yamaguchi | 428/695 |

*Primary Examiner*—Ellis P. Robinson
*Attorney, Agent, or Firm*—Sughrue, Mion, Zinn, Macpeak and Seas

[57] ABSTRACT

A magnetic recording medium having a magnetic layer formed on a non-magnetic base is disclosed. The magnetic layer comprises (1) magnetic particles, (2) an abrasive having a Mohs hardness of 6 or more, (3) calcium carbonate, (4) an aliphatic acid and (5) an aliphatic acid ester.

17 Claims, No Drawings

MAGNETIC RECORDING MEDIUM

FIELD OF THE INVENTION

The present invention relates to a magnetic recording medium, and more particularly, to a magnetic recording medium having a magnetic layer with increased durability and wear resistance.

BACKGROUND OF THE INVENTION

It is well known that a magnetic recording medium having increased wear resistance can be provided by using an abrasive having a Mohs hardness of 6 or more in the magnetic layer, for example, as described in U.S. Pat. No. 3,630,910 and Japanese Patent Application (OPI) No. 129935/80 (the term "OPI" as used herein refers to a "published unexamined Japanese patent application"). However, such a magnetic layer does not have satisfactory durability.

SUMMARY OF THE INVENTION

It is therefore one object of the present invention to provide a magnetic recording medium that is resistant to wear due to the friction against the magnetic head and which has increased durability.

Another object of the present invention is to provide a magnetic recording medium which is durable in that it retains desirable properties after being used repeatedly.

The objects of the invention can be achieved by a magnetic recording medium having a magnetic layer on a non-magnetic base that comprises (1) magnetic particles, (2) an abrasive having a Mohs hardness of 6 or more, (3) calcium carbonate, (4) an aliphatic acid and (5) an aliphatic acid ester.

DETAILED DESCRIPTION OF THE INVENTION

Among the magnetic (ferromagnetic) particles that can be used in the present invention are ferromagnetic iron oxide particles, ferromagnetic chromium dioxide particles and ferromagnetic alloy particles. The ferromagnetic iron oxides are those having the general formula $FeO_x$ wherein $x$ is not smaller than 1.33 but not greater than 1.50 ($1.33 \leq x \leq 1.50$), and they are maghemite ($\gamma$-$Fe_2O_3$, $x=1.50$), magnetite ($Fe_3O_4$, $x=1.33$) and Berthollide compounds thereof ($FeO_x$, $1.33 < x < 1.50$). The value of $x$ is represented by the formula:

$$x = \frac{1}{2 \times 100} \times \left\{ 2 \times \begin{pmatrix} \text{atomic \% of} \\ \text{ferrous ion} \end{pmatrix} + 3 \times \begin{pmatrix} \text{atomic \% of} \\ \text{ferric ion} \end{pmatrix} \right\}$$

These ferromagnetic iron oxides may contain a divalent metal such as Cr, Mn, Co, Ni, Cu or Zn. The divalent metal is used in an amount of 0 to 10 atomic % of the iron oxide.

The ferromagnetic chromium dioxides are $CrO_2$ which may optionally contain 0 to 20 wt% of a metal such as Na, K, Ti, V, Mn, Fe, Co, Ni, Tc, Ru, Sn, Ce or Pb, a semiconductor such as P, Sb or Te, or oxides of these metals.

The ferromagnetic alloy particles contain at least 75 wt% of a metal at least 80 wt% of which is made of at least one ferromagnetic metal (i.e., Fe, Co, Ni, Fe-Co, Fe-Ni, Co-Ni or Co-Ni-Fe) and not more than 20 wt% of which, preferably 0.5 to 5 wt% of which, is made of Al, Si, S, Sc, Ti, V, Cr, Mn, Cu, Zn, Y, Mo, Rh, Pd, Ag, Sn, Sb, Te, Ba, Ta, W, Re, Au, Hy, Pb, Bi, La, Ce, Pr, Nd, B or P. The alloy particles may also contain a small amount of water, hydroxide or oxide. The alloy particles have a length of about 6.5$\mu$ or less.

Specific examples of the ferromagnetic particles are described in Japanese Patent Publication Nos. 5515/61, 4825/62, 5009/64, 10307/64, 14090/69, 18372/70, 22062/72, 22513/72, 28466/71, 38755/71, 4286/72, 12422/72, 17284/72, 18509/72, 18573/72, 39639/73, U.S. Pat. Nos. 3,026,215, 3,031,341, 3,100,194, 3,242,005, 3,389,014, British Pat. Nos. 752,659, 782,762, 1,007,323, French Pat. No. 1,107,654, West German Patent Application (OLS) No. 1,281,334.

The ferromagnetic particles are dispersed in a binder which may be any known thermoplastic resin, thermosetting or reaction resin, or mixtures thereof. Suitable thermoplastic resins have a softening point of less than 150° C., an average molecular weight of about 10,000 to 200,000 and a degree of polymerization of about 200 to 2,000. Examples of such polymers are vinyl chloride/vinyl acetate copolymer, vinyl chloride/vinylidene chloride copolymer, vinyl chloride/acrylonitrile copolymer, acrylic acid ester/acrylonitrile copolymer, acrylic acid ester/vinylidene chloride copolymer, acrylic acid ester/styrene copolymer, methacrylic acid ester/acrylonitrile copolymer, methacrylic acid ester/vinylidene chloride copolymer, methacrylic acid ester/styrene copolymer, urethane elastomer, polyvinyl fluoride, vinylidene chloride/acrylonitrile copolymer, butadiene/acrylonitrile copolymer, polyamide resin, polyvinyl butyral, cellulose derivative (e.g., cellulose acetate butyrate, cellulose diacetate, cellulose triacetate, cellulose propionate, or nitrocellulose), styrene/butadiene copolymer, polyester resin, amino resins, various synthetic rubber thermoplastic resins (e.g., polybutadiene, polychloroprene, polyisoprene, and styrene/butadiene copolymer) and mixtures thereof. The vinyl chloride/vinyl acetate copolymer, vinyl chloride/vinylidene chloride copolymer, vinyl chloride/acrylonitrile copolymer, urethane elastomer, vinylidene chloride/acrylonitrile copolymer, polyamide resin, and cellulose derivative are particularly preferred.

Specific examples of these resins are given in Japanese Patent Publication Nos. 6877/62, 12528/64, 19282/64, 5349/65, 20907/65, 9463/66, 14059/66, 16985/66, 6428/67, 11621/67, 4623/68, 15206/68, 2889/69, 17947/69, 18232/69, 14020/70, 14500/70, 18573/72, 22063/72, 22064/72, 22068/72, 22069/72, 22070/72, 27886/72, U.S. Pat. Nos. 3,144,352, 3,419,420, 3,499,789 and 3,713,887.

The thermosetting or reaction resin is such that it has a molecular weight of less than 200,000 when it is in a coating solution. After application and drying of the coating solution, its molecular weight is increased infinitely due to condensation, addition or other reactions. Preferred thermoplastic or reaction resins are those which do not soften or melt until they are decomposed with heat. Specific examples are phenol-formaldehyde novolak resin, phenol-formaldehyde cresol resin, phenol-furfural resin, xylene-formaldehyde resin, urea resin, melamine resin, drying oil-modified alkyd resin, phenolic resin-modified alkyd resin, maleic acid resin-modified alkyd resin, unsaturated polyester resin, epoxy resin/curing agent (e.g., polyamine, acid anhydride, or polyamide), isocyanato-terminated polyester moisture hardening resin, isocyanato-terminated polyether moisture hardening resin, polyisocyanate prepolymer (compound having three or more isocyanato groups in one molecule as obtained by reacting diisocyanate with a low-molecular triol, diisocyanate trimer or tetramer), resin having a polyisocyanate prepolymer and active hydrogen (e.g., polyester polyol, polyether polyol, acrylic acid copolymer, maleic acid copolymer, 2-hydroxyethyl methacrylate copolymer, parahydroxystyrene copolymer) and mixtures thereof. The epoxy resin/curing agent, isocyanato-terminated polyester moisture hardening resin, isocyanato-terminated polyether moisture hardening resin, polyisocyanate prepolymer, and resin having a polyisocyanate prepolymer and active hydrogen are particularly preferred.

Specific examples of these resins are found in Japanese Patent Publication Nos. 8103/64, 9779/65, 7192/66, 8016/66, 14275/66, 18179/67, 12081/68, 28023/69, 14501/70, 24902/70, 13103/71, 22065/72, 22066/72, 22067/72, 22072/72, 22073/72, 28045/72, 28048/72, 28922/72, U.S. Pat. Nos. 3,144,353, 3,320,090, 3,437,510, 3,597,273, 3,781,210 and 3,781,211.

These binders are used alone or in admixture, and they may also be combined with additives. The weight ratio of the ferromagnetic particles to the binder is such that from 8 to 400, preferably from 10 to 200, more preferably from 10 to 100 parts by weight of the binder is used for 100 parts by weight of the ferromagnetic particles.

Examples of the abrasive used in the present invention are commonly used materials having a Mohs hardness of 6 or more (preferably 8 or more), such as fused alumina, silicon carbide, chromium oxide, corundum, artificial corundum, diamond, artificial diamond, garnet and emery (principal ingredients: corundum and magnetite). These abrasives are particles which generally have an average size of 0.05 to 5$\mu$, preferably 0.1 to 2$\mu$. They are used in an amount of 0.5 to 20 parts by weight for 100 parts by weight of the binder. For specific examples of the abrasives, see Japanese Patent Publication Nos. 18572/72, 15003/73, 15004/73 (U.S. Pat. No. 3,617,378), 39402/74, 9401/75, U.S. Pat. Nos. 3,007,807, 3,041,196, 3,293,066, 3,630,910, 3,687,725, British Pat. No. 1,145,349, West German Pat. (DT-PS) Nos. 853,211 and 1,101,000.

The amount of calcium carbonate used can vary over a wide range, but preferably, it is used in an amount of 5 to 30 vol%, more preferably 10 to 25 vol%.

The aliphatic acid is either a saturated or unsaturated aliphatic acid, and an aliphatic acid having 6 to 22 carbon atoms is preferred, and one having 12 to 18 carbon atoms is more preferred. Examples of the aliphatic acid used in the present invention are caprylic acid, lauric acid, myristic acid, oleic acid, stearic acid, erucic acid and behenic acid. The lauric acid, myristic acid, oleic acid, and stearic acid are particularly preferred. The aliphatic acids can be used alone or in admixture. The aliphatic acid is used in an amount of from 0.1 to 2 wt%, preferably from 0.2 to 1.5 wt%, more preferably from 0.5 to 1 wt%, of the magnetic particles.

Any aliphatic acid ester can be used in the present invention, but those having a melting point of 60° C. or lower are preferred, and those having a melting point of 40° C. or lower are particularly preferred. Examples of desired aliphatic acid esters are methyl stearate, amyl stearate, ethyl stearate, butyl palmitate, butyl myristate, oleyl oleate, and butyl laurate. The amyl stearate, ethyl stearate, oleyl oleate, and butyl laurate are particularly preferred. The aliphatic acid esters can be used alone or in admixture. They are used in an amount of from 0.1 to 2 wt%, preferably from 0.2 to 1.5 wt%, and more preferably 0.5 to 1 wt%, of the magnetic particles.

The magnetic particles, the binder, the abrasive and the other additives mentioned above are dispersed in an organic solvent with agitation, and the resulting coating solution is applied onto a non-magnetic base and dried. Before drying, the magnetic coating may be passed under a magnetic field to orient the magnetic particles. Alternatively, the surface of the dried magnetic layer may be subjected to smoothing treatment.

The non-magnetic base is made of a polyester such as polyethylene terephthalate, or polyethylene-2,6-naphthalate; a polyolefin such as polypropylene; a cellulosic derivative such as cellulose triacetate or cellulose diacetate; plastics such as polycarbonate; a non-magnetic metal such as Cu, Al, or Zn; and ceramics such as glass, porcelain and earthen ware. The base may be of any form such as film, tape, sheet, disc, card or drum, and a suitable material is used depending on the particular form. The base is about 2 to 50$\mu$, preferably 3 to 25$\mu$, thick when it is a film, tape or sheet, and about 0.5 to 10 mm thick when it is a disc or card. When the base is drum-shaped, it is in a cylindrical form whose specific configuration is determined by the recorder in which it is used. When a flexible base such as film, tape, sheet or thin flexible disc is used, the surface opposite the side provided with the magnetic layer may be provided with a back coating for various purposes, e.g., prevention of static buildup, transfer and wow flutter. For details of the back coating, see, for example, U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420, 3,166,688 and 3,761,311.

A magnetic recording layer is formed on the base from a coating solution comprising the magnetic particles, binder, abrasive and the other ingredients described above by air doctor coating, blade coating, air knife coating, squeeze coating, impregnate coating, reverse roll coating, transfer roll coating, gravure coating, kiss coating, cast coating and spray coating. For details of these and other coating techniques, see *Coating Kogaku* (*Coating Engineering*), published by Asakura Shoten, Mar. 20, 1971, pp. 253–277. Among these coating methods, the blade coating, reverse roll coating and gravure coating are particularly preferred. Any of these techniques may be used to form a magnetic layer on the non-magnetic base. Two or more magnetic layers may be formed by continuous application of these methods. Two or more magnetic layers may be formed simultaneously by multilayer simultaneous application as shown in Japanese Patent Application (OPI) Nos. 98803/73 (West German Patent Application (DT-OS) No. 2,309,159), 99233/73 (West German Patent Application (DT-AS) No. 2,309,158), etc.

Examples of the organic solvent used in the application of coating solution are ketones such as acetone, methyl ethyl ketone, methyl isobutyl ketone and cyclohexanone; alcohols such as methanol, ethanol, propanol and butanol; esters such as methyl acetate, ethyl acetate, butyl acetate, ethyl lactate, and glycol acetate monoethyl ether; ethers such as ether, glycol dimethyl ether, glycol monoethyl ether and dioxane; tars (aromatic hydrocarbons) such as benzene, toluene and xylene; and chlorinated hydrocarbons such as methylene chloride, ethylene chloride, carbon tetrachloride, chloroform, ethylene chlorohydrin, and dichlorobenzene. The methyl ethyl ketone, methyl isobutyl ketone, cyclohexanone, butanol, butyl acetate, toluene, and xylene are particularly preferred.

As mentioned above, the magnetic layer formed by these methods may be passed under a magnetic field to orient the magnetic particles before it is dried. If necessary, the surface of the magnetic layer may be smoothed. Then, the resulting magnetic medium is cut into a desired shape. It has been found that smoothing of the surface of the magnetic layer is particularly effective for forming a magnetic recording medium having a smooth surface and increased wear resistance. For the orientation purpose, the magnetic layer is passed under an a.c. or d.c. magnetic field having a magnetizing force of about 500 to 2,000 Gauss. The applied magnetic layer is dried at a temperature between about 50° and 120° C., preferably between about 70° and 1000° C., and more preferably between about 80° and 90° C., with air being blown at a rate of 1 to 5 kl/m$^2$, preferably 2 to 3 kl/m$^2$, for a period of about 30 seconds to 10 minutes, preferably 1 to 5 minutes. The direction of the orientation is determined by the use of the magnetic medium. For audio tape, small-size video tape and memory tape, the direction is parallel to the tape length, whereas for broadcasting video tape, the direction is 30 to 90 degrees off the tape length. More information on the method of orientation of magnetic particles is contained in U.S. Pat. Nos. 1,949,840, 2,796,359, 3,001,891, 3,172,776, 3,416,949, 3,473,960, 3,681,138, Japanese Patent Publication Nos. 3427/57, 28368/64, 23624/65, 23625/65, 13181/66, 13043/73 and 39722/73.

The magnetic recording medium of the present invention has the following advantages:

(1) The medium is the least likely to damage the head of a magnetic recording apparatus. In other words, the medium has little chance of scraping or abrading the head. This advantage is conspicuous in operation at low temperature;

(2) The medium is the least likely to wear the magnetic head. This advantage is also conspicuous in operation at low temperatures; and (3) The still life is excellent.

(4) The medium has good contact with the head and runnability (particularly when it is in a tape form), thus providing a good picture.

The present invention is now described in greater detail by reference to the following examples and comparative examples which are given here for illustrative purposes only and are by no means intended to limit its scope. In the examples and comparative examples, all parts are by weight.

EXAMPLE 1 AND COMPARATIVE EXAMPLES 1 TO 11

A composition of the formulation indicated below was stirred with a sand grinder and the resulting coating solution was applied to a polyester film base and dried.

| | |
|---|---|
| Cobalt-containing γ-Fe$_2$O$_3$ particles | 100 parts |
| Vinyl chloride/vinyl acetate/vinyl alcohol copolymer | 10 parts |
| Polyester polyurethane | 15 parts |
| Polyisocyanate | 8 parts |
| Carbon black | 5 parts |
| Chromium oxide particles (Cr$_2$O$_3$) having a Mohs hardness of 8 to 9 | The amount described in Tables 1 and 2 |
| Calcium carbonate | The amount described in Tables 1 and 2 |
| Stearic acid | The amount described in Tables 1 and 2 |
| Butyl stearate | The amount described in Tables 1 and 2 |
| Methyl ethyl ketone | 300 parts |

The resulting product was slit into a width of ¾ inch. The so-obtained U-matic VTR tape was subjected to still life and head wear tests, the results of which are shown in Table 1. A control VTR tapes were prepared by repeating the same procedure except that CaCO$_3$ was replaced by α-Fe$_2$O$_3$ particles (Comparative Examples 8 and 9) and by repeating the same procedure as in Example 1 except that either stearic acid or butyl stearate was not added (Comparative Examples 10 and 11). The results are shown in Table 1 below.

TABLE 1

| Example No. | Cr$_2$O$_3$ (parts) | CaCO$_3$ [vol %] (parts) | α-Fe$_2$O$_3$ (parts) | Stearic Acid (parts) | Butyl Stearate (parts) |
|---|---|---|---|---|---|
| Example 1 | 1.5 | 9.6[20] | — | 1.0 | 1.0 |
| Comparative Example 1 | 1.5 | 9.6[20] | — | 0 | 0 |
| Comparative Example 2 | 1.5 | 0 | — | 1.0 | 1.0 |
| Comparative Example 3 | 1.5 | 0 | — | 0 | 0 |
| Comparative Example 4 | 0 | 9.6[20] | — | 1.0 | 1.0 |
| Comparative Example 5 | 0 | 9.6[20] | — | 0 | 0 |
| Comparative Example 6 | 0 | 0 | — | 1.0 | 1.0 |
| Comparative Example 7 | 0 | 0 | — | 0 | 0 |
| Comparative Example 8 | 2.0 | — | 4.0 | 0 | 0 |
| Comparative Example 9 | 2.0 | — | 4.0 | 0 | 0.8 |
| Comparative Example 10 | 1.5 | 9.6[20] | — | 1.0 | 0 |
| Comparative Example 11 | 1.5 | 9.6[20] | — | 0 | 1.0 |

| | Measured at 5° C. | | Measured at Room Temperature | | |
|---|---|---|---|---|---|
| Example No. | Initial Still Life (min) | Wear due to Friction against Magnetic Head (μm/100 hr) | Still Life after 100 Passes on VTR at 5° C. (min) | Initial Still Life (min) | Wear due to Friction against Magnetic Head (μm/100 hr) |
| Example 1 | >120 | 2 | >120 | >120 | 2 |
| Comparative Example 1 | 2 | 9 | <1 | 10 | 4 |
| Comparative Example 2 | 60 | 7 | 3 | >120 | 3 |
| Comparative Example 3 | 1 | 8 | <1 | 7 | 7 |
| Comparative Example 4 | 5 | tendency of magnetic layer to be scraped made accurate measurement | low durability | 15 | 2 |

TABLE 1-continued

| | | | | | |
|---|---|---|---|---|---|
| Comparative Example 5 | <1 | impossible tendency of magnetic layer to be scraped made accurate measurement impossible | low durability | <1 | 2 |
| Comparative Example 6 | 3 | magnetic layer scraped and measurement impossible | <1 | 9 | low durability |
| Comparative Example 7 | <1 | magnetic layer scraped and measurement impossible | <1 | <1 | low durability |
| Comparative | 1 | 10 | <1 | 30 | 5.5 |
| Example 8 Comparative Example 9 | 30 | 8 | 3 | 60 | 5 |
| Comparative Example 10 | 2 | 4 | <1 | 13 | 2.5 |
| Comparative Example 11 | 35 | 7 | 3 | >120 | 3.5 |

As is clear from Table 1, the magnetic recording medium of the present invention (Example 1) retained good still life after use at a temperature as low as 5° C. and was worn little by friction against the magnetic head. Further, it can be seen from Table 1 that Comparative Example 4 containing no abrasive ($Cr_2O_3$) provided inferior in the point of a still life, a magnetic effect and a durability, Comparative Examples 1 and 3 containing no stearic acid and butyl stearate simultaneously provided remarkably inferior magnetic recording medium in the point of a still life, which was much inferior to Example 1 and Comparative Example 2 with respect to the wear resistance against magnetic head, and Comparative Examples 2 and 3 containing no $CaCO_3$ provided an inferior magnetic recording medium that is inferior to Example 1 with respect to the still life, respectively.

Comparative Examples 8 and 9 as a control that were prior art products were much inferior to Example 1 with respect to the still life and wear resistance. In Comparative Example 10 containing no butyl stearate, it can be seen that it was worn little by friction against the magnetic head as compared with Comparative Example 1, but the improved degree thereof was inferior to Example 1. In Comparative Example 11 containing no stearic acid, it can be seen that it had good initial still life than Comparative Example 1, but the improved degree thereof was inferior to Example 1. Specifically, the difference in the still life after 100 passes on VTR at 5° C. (measured at room temperature) was remarkable.

EXAMPLES 2 TO 9 AND COMPARATIVE EXAMPLE 12

U-matic VTR tapes were prepared as in Example 1 except that the respective ingredients and their amounts were changed as indicated in Table 2. The tapes were subjected to the same tests as in Example 1, the results of which are set forth in Table 2.

TABLE 2

| | | | | | Measured at 5° C. | | Measured at Room Temperature | |
|---|---|---|---|---|---|---|---|---|
| Example No. | Abrasive [Mohs hardness] (parts) | $CaCO_3$ [vol %] (parts) | Stearic Acid (parts) | Butyl Stearate (parts) | Initial Still Life (min) | Wear due to Friction against Magnetic Head ($\mu m/100$ hr) | Still Life after 100 Passes in VTR at 5° C. (min) | Initial Still Life (min) | Wear due to Friction against Magnetic Head ($\mu m/100$ hr) |
| 2 | $Cr_2O_3$ 1.5 [8~9] | 2.4 [5] | 1.0 | 1.0 | >120 | 4 | 25 | >120 | 3 |
| 3 | $Cr_2O_3$ 1.5 [8~9] | 4.8 [10] | 1.0 | 1.0 | >120 | 3 | 62 | >120 | 2 |
| 4 | $Cr_2O_3$ 1.5 [8~9] | 12.0 [25] | 1.0 | 1.0 | >120 | 2 | >120 | >120 | 2 |
| 5 | $Cr_2O_3$ 1.5 [8~9] | 14.4 [30] | 1.0 | 1.0 | >120 | 3 | >120 | >120 | 2 |
| 6 | $Cr_2O_3$ 1.5 [8~9] | 24.0 [50] | 1.0 | 1.0 | >120 | 6 | >120 | >120 | 4 |
| 7 | MgO 1.5 [6] | 9.6 [20] | 1.0 | 1.0 | >120 | 2 | >120 | >120 | 1.5 |
| 8 | $\alpha$-$Al_2O_3$ 1.5 [9] | 9.6 [20] | 1.0 | 1.0 | >120 | 2 | >120 | >120 | 1 |
| 9 | Sic 1.5 [9.5] | 9.6 [20] | 1.0 | 1.0 | >120 | 3 | >120 | >120 | 2 |
| Comp. Ex. 12 | $\alpha$-$Fe_2O_3$ 1.5 [5.5] | 9.6 [20] | 1.0 | 1.0 | 30 | 2 | 15 | 55 | 2 |

As is clear from the data for Examples 2 to 6 in Table 2 and for Example 1 and Comparative Example 2 in Table 1, good results in the initial still life and still life after 100 passes in VTR at 5° C. are obtained when the amount of calcium carbonate used is between 5 and 30 vol%. The data for Examples 7 to 9 and Comparative Example 12 in Table 2 shows that when various abrasives having a Mohs hardness of 6 or more replaced $Cr_2O_3$ particles, a magnetic recording media of Examples 7 to 9 had well balanced properties in the durability as compared with Comparative Example 12. In summary, the magnetic recording medium of the present invention exhibits wear resistance and still life that are consistently good over a wide range of temperatures.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising:
   a non-magnetic support base; and
   a magnetic layer formed on a surface of said non-magnetic support base, said magnetic layer comprising magnetic particles dispersed within a binder, an abrasive having a Mohs hardness of 6 or more, calcium carbonate, an aliphatic acid in an amount of from 0.1 to 2 weight percent of the magnetic particles and an aliphatic acid ester in an amount of 0.1 to 2 weight percent of the magnetic particles.

2. A magnetic recording medium as claimed in claim 1, wherein said binder is a thermoplastic resin having a softening point of less than 150° C. and an average molecular weight of about 10,000 to 200,000 and a degree of polymerization of about 200 to 2,000.

3. A magnetic recording medium as claimed in claim 1, wherein said magnetic particles are ferromagnetic particles and the weight ratio of said ferromagnetic particles to said binder is from 8 to 400 parts by weight of said binder per 100 parts by weight of said ferromagnetic particles.

4. A magnetic recording medium as claimed in claim 3, wherein said ratio of said ferromagnetic particles to said binder in such that 10 to 200 parts by weight of said binder is used per 100 parts by weight of said ferromagnetic particles.

5. A magnetic recording medium as claimed in claim 1, wherein said abrasive is comprised of particles having an average size of 0.05 to 5$\mu$.

6. A magnetic recording medium as claimed in claim 5, wherein said abrasive particles have an average size of 0.1 to 2$\mu$, and are contained in an amount of 0.5 to 20 parts by weight per 100 parts by weight of said binder.

7. A magnetic recording medium as claimed in claim 1, wherein said aliphatic acid is a saturated aliphatic acid containing 6 to 22 carbon atoms.

8. A magnetic recording medium as claimed in claim 7, wherein said aliphatic acid contains 12 to 18 carbon atoms.

9. A magnetic recording medium as claimed in claim 1, wherein said aliphatic acid is an unsaturated aliphatic acid containing 6 to 22 carbon atoms.

10. A magnetic recording medium as claimed in claim 9, wherein said aliphatic acid contains 12 to 18 carbon atoms.

11. A magnetic recording medium as claimed in claim 7, 8, 9, or 10, wherein said aliphatic acid is contained in an amount of from 0.2 to 1.5 weight percent.

12. A magnetic recording medium as claimed in claim 11, wherein said aliphatic acid is contained in an amount of from 0.5 to 1 weight percent.

13. A magnetic recording medium as claimed in claim 1, wherein said aliphatic acid ester has a melting point of 60° C. or lower.

14. A magnetic recording medium as claimed in claim 13, wherein said aliphatic acid ester has a melting point of 40° C. or lower.

15. A magnetic recording medium as claimed in claim 1, 13 or 14, wherein said aliphatic acid ester is contained in an amount of 0.2 to 1.5 weight percent.

16. A magnetic recording medium as claimed in claim 15, wherein said aliphatic acid ester is contained in an amount of 0.5 to 1 weight percent.

17. A magnetic recording medium as claimed in claim 1, wherein said non-magnetic support base is a tape having a thickness of 2 to 50$\mu$.

* * * * *